US012732413B2

(12) United States Patent
Nguyen

(10) Patent No.: US 12,732,413 B2
(45) Date of Patent: Sep. 8, 2026

(54) NETWORK PATHWAY DIAGNOSIS

(71) Applicant: Oracle International Corporation, Redwood Shores, CA (US)

(72) Inventor: Trung Hoai Nguyen, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 206 days.

(21) Appl. No.: 18/603,053

(22) Filed: Mar. 12, 2024

(65) Prior Publication Data

US 2025/0293915 A1 Sep. 18, 2025

(51) Int. Cl.
*H04L 41/0631* (2022.01)
*H04L 41/12* (2022.01)
*H04L 41/16* (2022.01)

(52) U.S. Cl.
CPC ............ *H04L 41/064* (2013.01); *H04L 41/12* (2013.01); *H04L 41/16* (2013.01)

(58) Field of Classification Search
CPC ........ H04L 41/064; H04L 41/12; H04L 41/16
See application file for complete search history.

(56) References Cited

U.S. PATENT DOCUMENTS 10,785,093 B2 9/2020 Khanna et al.
11,038,775 B2 6/2021 Pandey et al.
12,289,220 B1 * 4/2025 Pillay ...................... H04L 41/16
2008/0025231 A1 1/2008 Sharma et al.
2019/0044824 A1 2/2019 Yadav et al.
2019/0165988 A1 * 5/2019 Wang .................... H04L 41/065
2021/0342857 A1 * 11/2021 Tzur ........................ G06N 7/01
2022/0066852 A1 3/2022 Ramanujan et al.
2023/0053913 A1 2/2023 De Souza et al.
2023/0105304 A1 4/2023 Mandal et al.
2023/0208700 A1 6/2023 Qian et al.

(Continued)

OTHER PUBLICATIONS

"Azure Kubernetes Service Diagnose and Solve Problems overview", Retrieved from https://learn.microsoft.com/en-us/azure/aks/aks-diagnostics, Apr. 26, 2023, pp. 5.

(Continued)

*Primary Examiner* — Tonia L Dollinger
*Assistant Examiner* — Joseph M Cousins
(74) *Attorney, Agent, or Firm* — Invoke

(57) ABSTRACT

Techniques are disclosed for network pathway diagnosis. The system accesses sets of training data. The sets of training data define associations between issues of computer networks and network pathways of the computer networks. The training data is used to train a machine learning model to select for diagnosis network pathways in computer networks. An issue is detected in a computer network that incorporates a cluster of computing nodes configured for executing containerized applications. The trained machine learning model is applied to select a target network pathway in the computer network for diagnosis based on a target set of characteristics that are associated with the issue. Diagnosing the target network pathway reveals that the target network pathway is dysfunctional, why the target network pathway is dysfunctional, and/or actions that potentially resolve the dysfunction of the target network pathway.

18 Claims, 9 Drawing Sheets

(56) References Cited

U.S. PATENT DOCUMENTS

2023/0291636 A1 9/2023 Kolar et al.
2023/0362178 A1 11/2023 Pandey et al.
2025/0110865 A1* 4/2025 Gottiparthy ........... G06F 3/0631
2025/0209404 A1* 6/2025 Mandal .............. G06Q 10/0637
2025/0247283 A1* 7/2025 Zhang ................. H04L 41/0631
2025/0279941 A1* 9/2025 Vasseur ................. H04L 41/145

OTHER PUBLICATIONS

"Cluster Mesh", Retrieved from https://cilium.io/use-cases/cluster-mesh/, Retrieved on Dec. 22, 2023, pp. 9.
"Identity-aware L3/L4/DNS Network Flow Logs", Retrieved from https://cilium.io/use-cases/network-flow-logs/, Retrieved on Dec. 22, 2023, pp. 5.
"Network path analysis", Retrieved from https://www.manageengine.com/network-monitoring/network-path-analysis.html, Retrieved on Dec. 22, 2023, pp. 6.
"Skydive—Real-time network analyzer", Retrieved from https://skydive.network/, Retrieved on Dec. 22, 2023, pp. 5.
"What is Azure Kubernetes Service (AKS)Network Observability? (Preview)", Retrieved from https://learn.microsoft.com/en-us/azure/aks/network-observability-overview, Jun. 20, 2023, pp. 3.
Sun et al., "How to automatically resolve trouble tickets with machine learning", Retrieved from https://www.ericsson.com/en/blog/2020/10/how-to-resolve-trouble-tickets-machine-learning, Oct. 16, 2020, pp. 13.

* cited by examiner

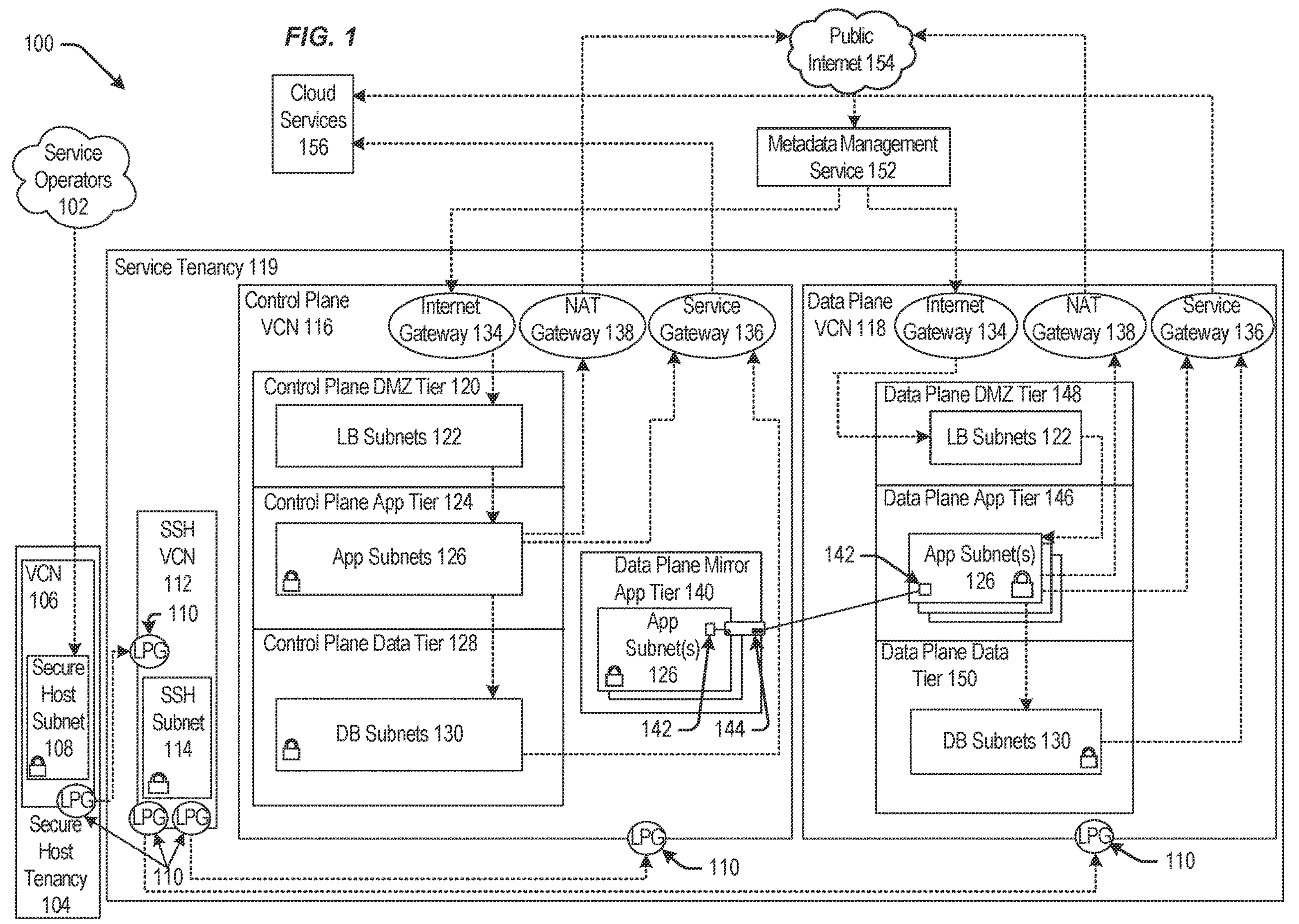
FIG. 1
100
Service Operators 102
Cloud Services 156
Public Internet 154
Metadata Management Service 152
Service Tenancy 119
Control Plane VCN 116
Internet Gateway 134
NAT Gateway 138
Service Gateway 136
Control Plane DMZ Tier 120
LB Subnets 122
Control Plane App Tier 124
App Subnets 126
Control Plane Data Tier 128
DB Subnets 130
Data Plane Mirror App Tier 140
App Subnet(s) 126
142
144
Data Plane VCN 118
Internet Gateway 134
NAT Gateway 138
Service Gateway 136
Data Plane DMZ Tier 148
LB Subnets 122
Data Plane App Tier 146
App Subnet(s) 126
142
Data Plane Data Tier 150
DB Subnets 130
SSH VCN 112
110
LPG
SSH Subnet 114
LPG
LPG
110
LPG
110
LPG
110
VCN 106
Secure Host Subnet 108
LPG
Secure Host Tenancy 104

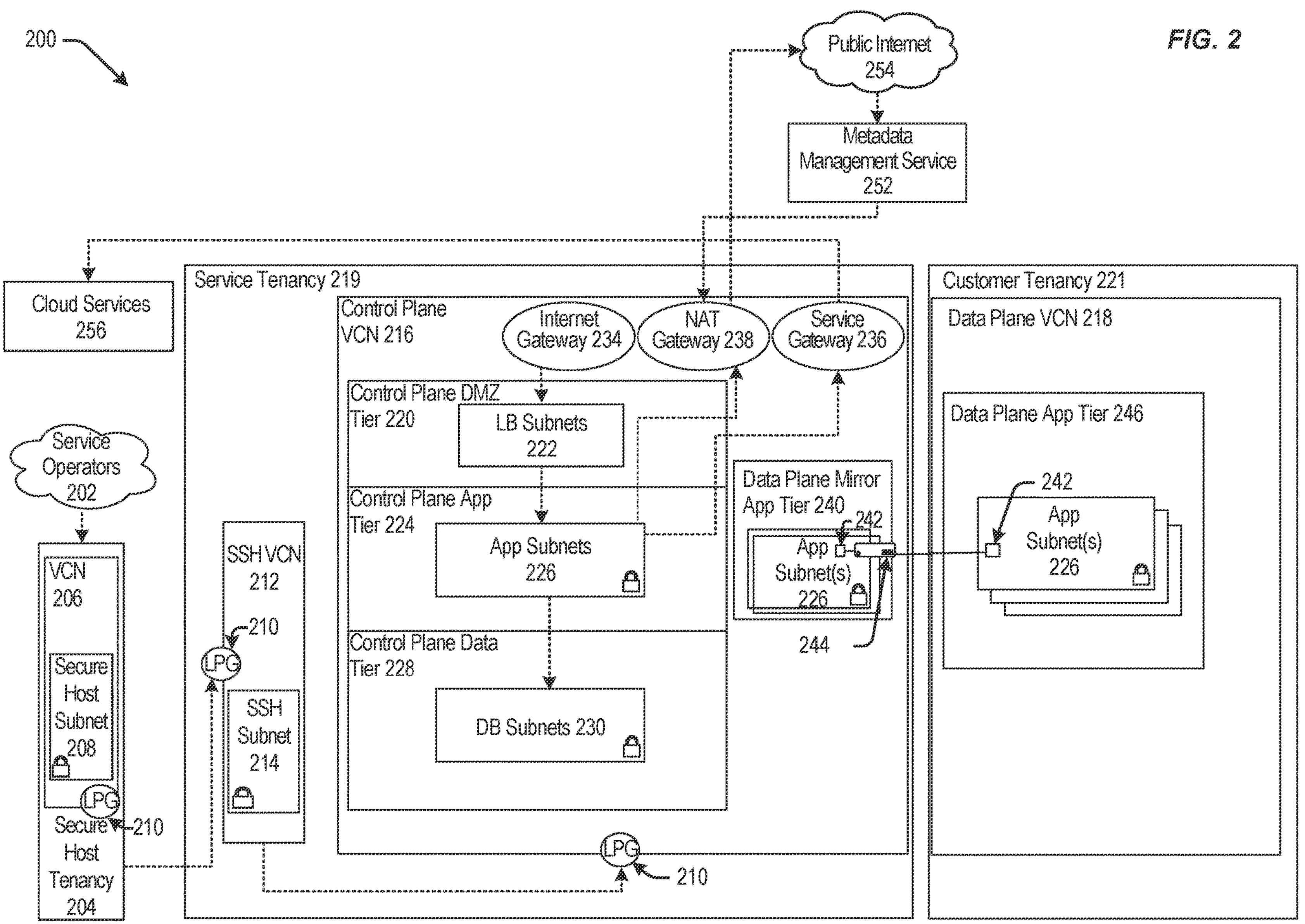
200
FIG. 2
Public Internet 254
Metadata Management Service 252
Cloud Services 256
Service Operators 202
VCN 206
Secure Host Subnet 208
LPG
Secure Host Tenancy 204
210
Service Tenancy 219
SSH VCN 212
210
LPG
SSH Subnet 214
Control Plane VCN 216
Internet Gateway 234
NAT Gateway 238
Service Gateway 236
Control Plane DMZ Tier 220
LB Subnets 222
Control Plane App Tier 224
App Subnets 226
Control Plane Data Tier 228
DB Subnets 230
Data Plane Mirror App Tier 240
242
App Subnet(s) 226
244
LPG
210
Customer Tenancy 221
Data Plane VCN 218
Data Plane App Tier 246
242
App Subnet(s) 226

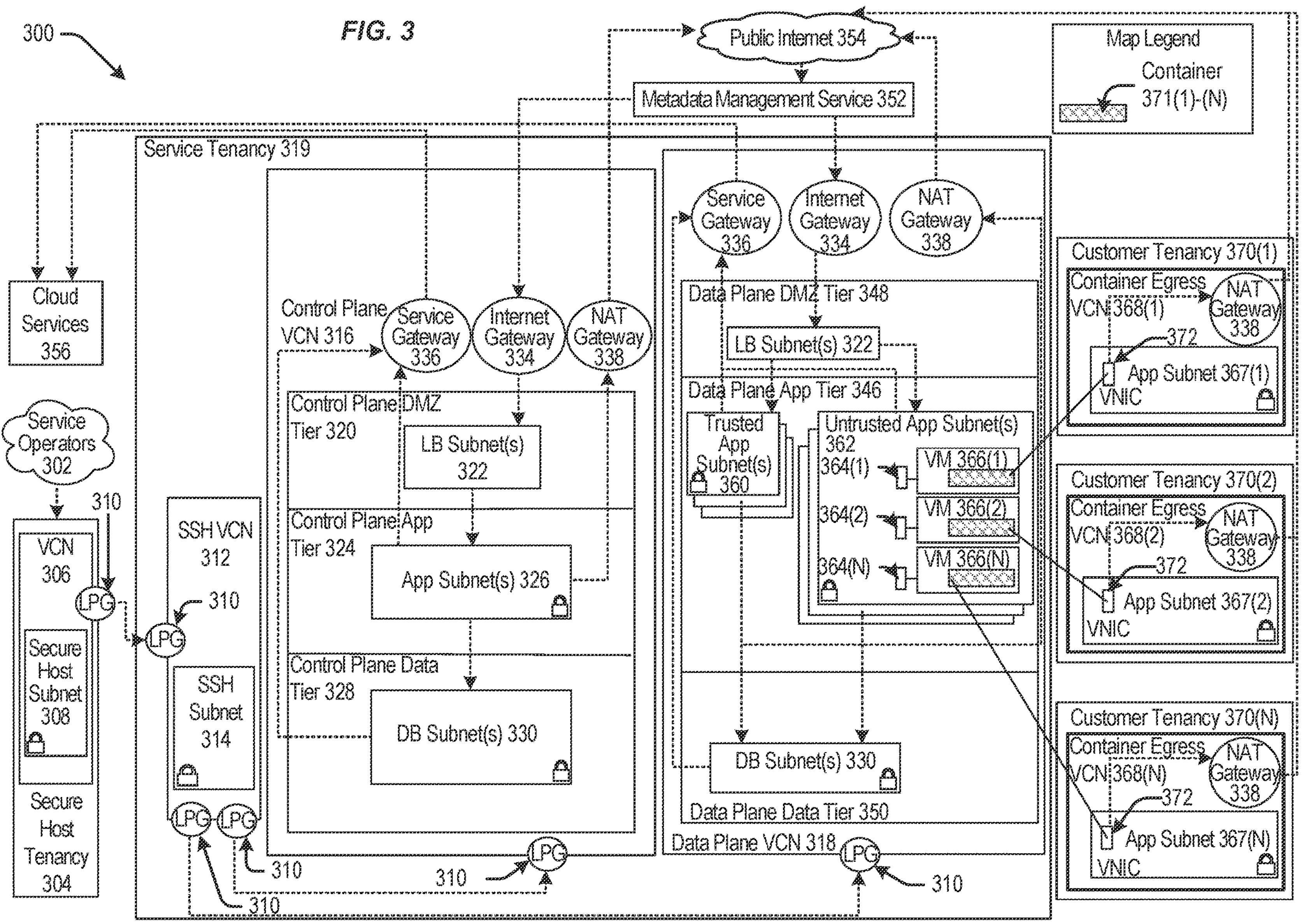
300
FIG. 3
Public Internet 354
Metadata Management Service 352
Map Legend
Container
371(1)-(N)
Service Tenancy 319
Cloud Services 356
Service Operators 302
310
VCN 306
LPG
Secure Host Subnet 308
Secure Host Tenancy 304
SSH VCN 312
SSH Subnet 314
Control Plane VCN 316
Service Gateway 336
Internet Gateway 334
NAT Gateway 338
Control Plane DMZ Tier 320
LB Subnet(s) 322
Control Plane App Tier 324
App Subnet(s) 326
Control Plane Data Tier 328
DB Subnet(s) 330
Data Plane DMZ Tier 348
LB Subnet(s) 322
Data Plane App Tier 346
Trusted App Subnet(s) 360
Untrusted App Subnet(s) 362
364(1)
364(2)
364(N)
VM 366(1)
VM 366(2)
VM 366(N)
DB Subnet(s) 330
Data Plane Data Tier 350
Data Plane VCN 318
Customer Tenancy 370(1)
Container Egress VCN 368(1)
372
App Subnet 367(1)
VNIC
Customer Tenancy 370(2)
Container Egress VCN 368(2)
App Subnet 367(2)
Customer Tenancy 370(N)
Container Egress VCN 368(N)
App Subnet 367(N)

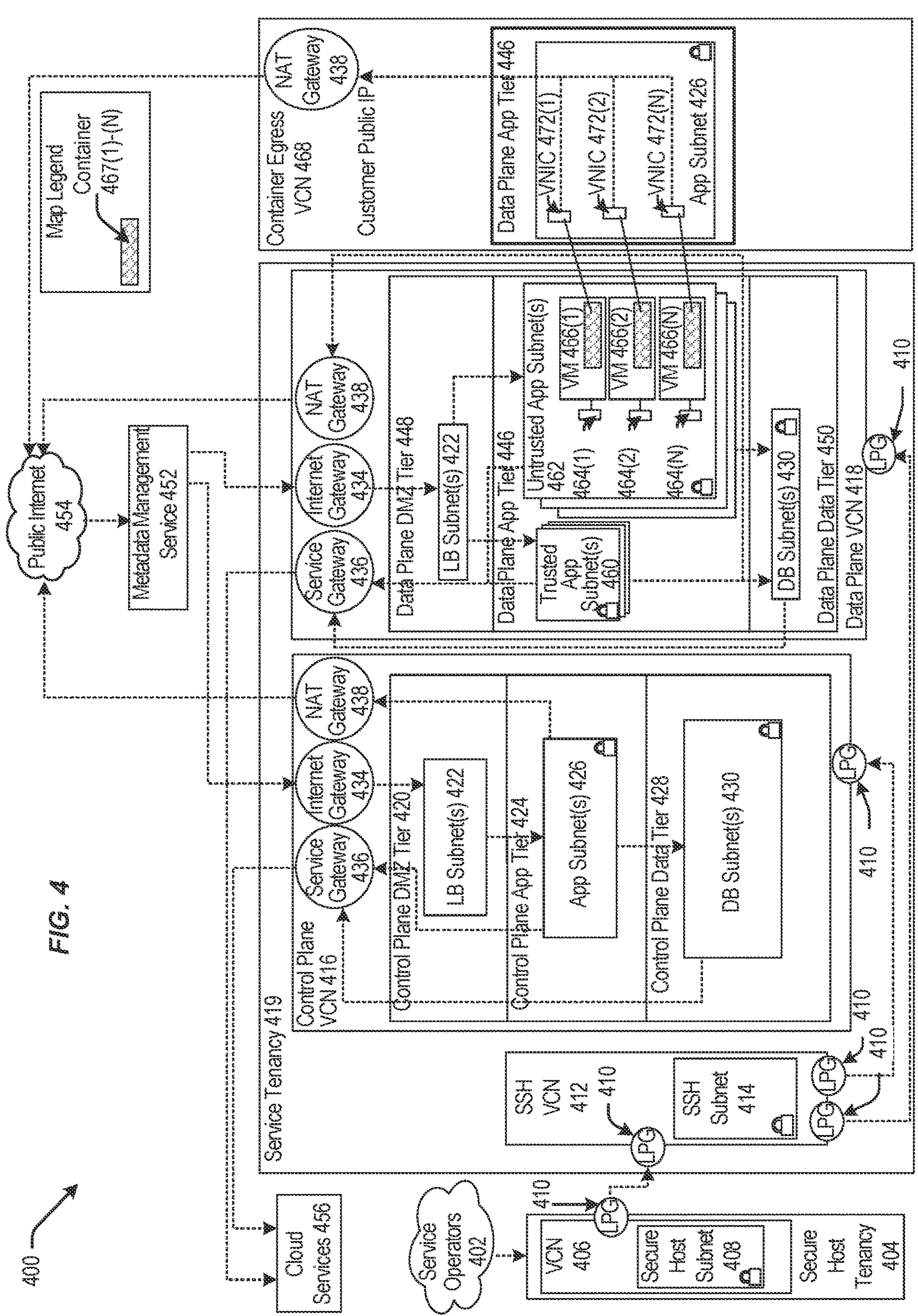
FIG. 4
400
Cloud Services 456
Service Operators 402
VCN 406
Secure Host Subnet 408
Secure Host Tenancy 404
LPG
410
Service Tenancy 419
SSH VCN 412
SSH Subnet 414
Control Plane VCN 416
Service Gateway 436
Internet Gateway 434
NAT Gateway 438
Control Plane DMZ Tier 420
LB Subnet(s) 422
Control Plane App Tier 424
App Subnet(s) 426
Control Plane Data Tier 428
DB Subnet(s) 430
Public Internet 454
Metadata Management Service 452
Data Plane DMZ Tier 448
Data Plane App Tier 446
Trusted App Subnet(s) 460
Untrusted App Subnet(s) 462
464(1)
464(2)
464(N)
VM 466(1)
VM 466(2)
VM 466(N)
DB Subnet(s) 430
Data Plane Data Tier 450
Data Plane VCN 418
Map Legend
Container 467(1)-(N)
Container Egress VCN 468
Customer Public IP
VNIC 472(1)
VNIC 472(2)
VNIC 472(N)
App Subnet 426

NETWORK PATHWAY DIAGNOSIS

TECHNICAL FIELD

The present disclosure relates to diagnosing network pathways.

BACKGROUND

A computer network contains network pathways. A network pathway is a physical and/or virtual link between network components of a computer network. Network components are physical and/or virtual. A network component that is connected by a network pathway need not be an origin or endpoint of the network pathway. A network pathway may connect multiple network components, and two network components may be connected by multiple network pathways. A computer network may contain many different types of network pathways and network components.

An issue associated with a computer network may be related to dysfunction within the computer network. In an example, a dysfunctional network pathway of a computer network results in the manifestation of an issue associated with the computer network. In this example, the cause of the dysfunctional network pathway may be the root cause of the issue associated with the computer network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and they mean at least one. In the drawings:

FIGS. 1-4 are block diagrams illustrating patterns for implementing a cloud infrastructure as a service system in accordance with one or more embodiments;

DETAILED DESCRIPTION

Figure 5:
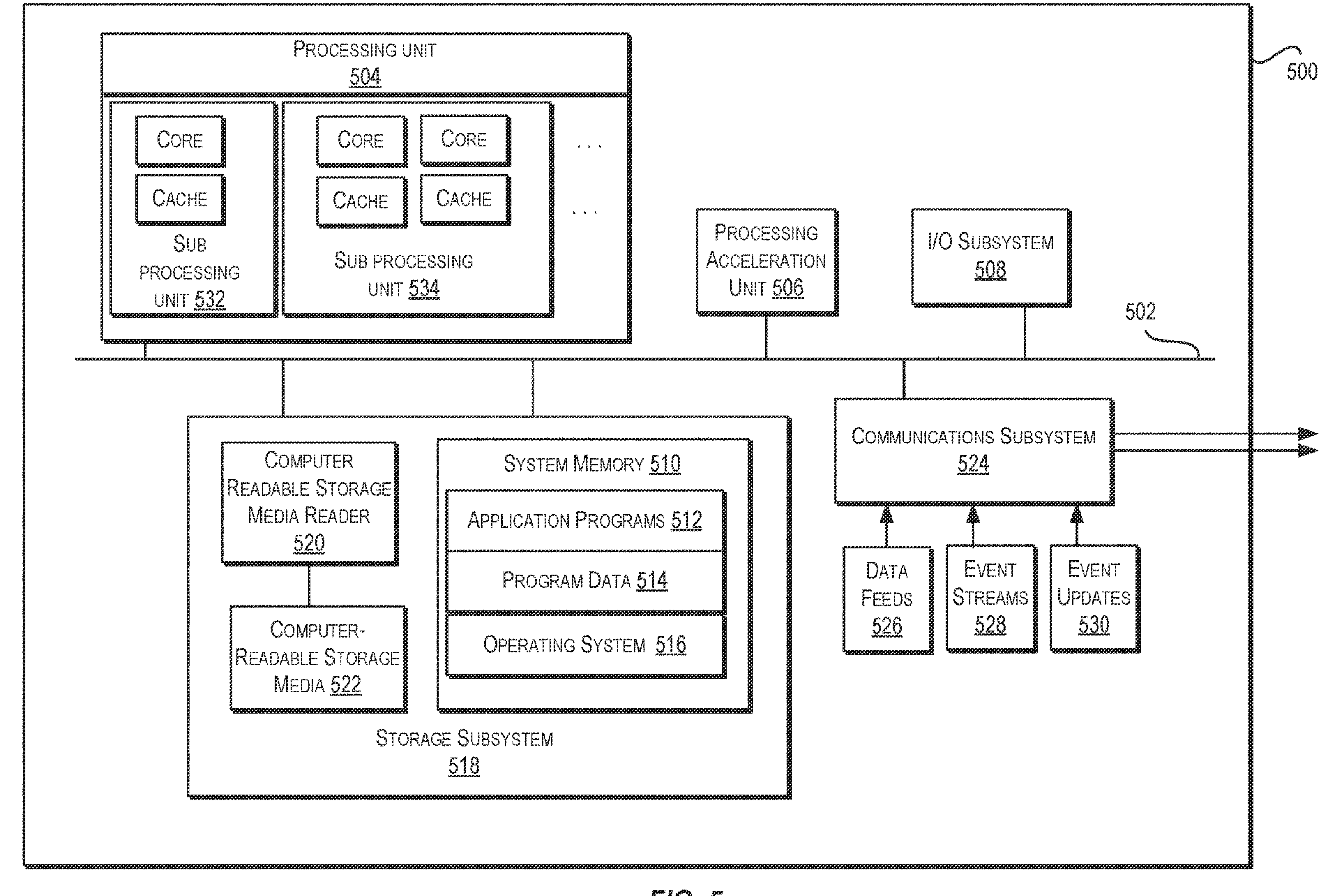
FIG. 5 is a hardware system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

The following table of contents is provided for the reader's convenience and is not intended to define the limits of the disclosure.

1. GENERAL OVERVIEW
2. CLOUD COMPUTING TECHNOLOGY
3. COMPUTER SYSTEM
4. NETWORK PATHWAY DIAGNOSIS SYSTEM
5. DIAGNOSING A NETWORK PATHWAY
6. MACHINE LEARNING FOR NETWORK PATHWAY SELECTION
7. EXAMPLE EMBODIMENT
8. MISCELLANEOUS; EXTENSIONS

1. General Overview

One or more embodiments detect an issue relating to a cluster of computing nodes in a computer network and apply a trained machine learning model to select a network pathway for diagnosis. By diagnosing the network pathway, the system reveals a root cause of the issue.

An embodiment trains a machine learning model(s) to select a network pathway(s) for diagnosis. In particular, a machine learning model is trained to select a network pathway of a computer network that, if dysfunctional, results in the manifestation of an issue that has been detected in the computer network. The machine learning model is trained with sets of training data. An example set of training data defines an association between an issue relating to a cluster of computing nodes of a computer network and a network pathway to be selected for diagnosis. Optionally, feedback regarding selections by the machine learning model is used to further train the machine learning model.

An embodiment detects network pathways and network components. Network pathways and network components of a computer network are detected based on network configuration information and/or other information. In an example, the system detects network pathways and network components of a computer network that includes a cluster of computing nodes configured for executing containerized applications. A Kubernetes cluster is an example of a cluster of computing nodes configured for executing containerized applications.

An embodiment detects an issue(s) associated with a computer network. In an example, an issue associated with a computer network relates to a cluster of computing nodes configured for executing containerized applications. Examples of issues that the system is capable of detecting include a DNS failure, a control plane failure, a failure of a node to register, a security list failure, network-connectivity issues, unexpected outputs, an unsuccessful execution of an operation, and/or other occurrences.

An embodiment detects an issue(s) associated with a computer network based on user input(s). User input is received through a user interface. The user input describes an issue experienced by a user. Example user input includes a selection of a user interface element that corresponds to a characteristic associated with the issue (e.g., a type, severity, location, scale, frequency, timing, symptoms, related events, etc.), a natural language input describing the issue (e.g., input to a text field), and/or other user inputs.

An embodiment autonomously detects an issue(s) of a computer network by proactively monitoring network operating conditions, network activity, user activity, and/or other information. The system detects an issue based on observing an occurrence and/or condition that is indicative of an issue.

In an example, the system detects an issue relating to a cluster of computing nodes configured for executing containerized applications based on observing a failure of an operation involving the cluster of computing nodes.

An embodiment generates a feature set that represents an issue of a computer network. A feature set defines characteristics associated with an issue. The feature set is generated based on information that alerts the system to an issue and/or additional contextual information. Information that alerts the system to an issue includes user input, observations that are indicative of an issue, and/or other information. In an example, generating a feature set involves applying natural language processing to a natural language user input that describes an issue experienced by a user.

An embodiment applies a trained machine learning model(s) to select a network pathway(s) for diagnosis. A trained machine learning model selects a network pathway for diagnosis based on a set of characteristics associated with an issue. A set of characteristics associated with an issue is obtained from a feature set and/or other sources. The set of characteristics includes characteristics of the issue, characteristics of a computer network that the issue corresponds to, characteristics of a user experiencing the issue, and/or other characteristics.

An embodiment diagnoses a network pathway(s) by executing a diagnostic(s) that evaluates the functionality of the network pathway(s). An example diagnostic that evaluates a network pathway measures attributes, such as connectivity, performance, bandwidth, reliability, health, redundancy, security, and/or other characteristics. A diagnostic that evaluates a network pathway reveals if the network pathway is dysfunctional, a cause of the dysfunction, a means for resolving the dysfunction, and/or other information.

An embodiment diagnoses a network pathway(s) by executing a diagnostic that evaluates the connectivity of the network pathway(s). The system evaluates the connectivity of a network pathway of a computer network by analyzing network configuration information and/or other information. In an example, the system analyzes routing information and security rules that are applicable to a network pathway to predict a connectivity status of the network pathway. In this example, the connectivity status of the network pathway is predicted without attempting to send network traffic through the network pathway. Additionally, or alternatively, the system evaluates the connectivity of a network pathway by testing the connectivity of the network pathway. The system tests the connectivity of the network pathway by attempting to transmit network traffic through the network pathway.

An embodiment determines a cause(s) of a dysfunctional network pathway(s). A cause of a dysfunctional network pathway can be a root cause of an issue associated with a computer network. The system determines a cause of a dysfunctional network pathway based on diagnosis of the dysfunctional network pathway. In an example, the connectivity of a dysfunctional network pathway is evaluated by analyzing network configuration information. In this example, the system determines that the dysfunctional network pathway lacks connectivity due to a misconfiguration of a computer network that includes the network pathway.

An embodiment formulates a communication(s) that indicates results of diagnosing a network pathway(s). The system transmits a communication indicating results of a diagnosis to a recipient. In an example, an issue is detected based on user input describing the issue, a network pathway is selected for diagnosis based on the user input, and a diagnosis of the network pathway reveals that the network pathway is dysfunctional. In this example, the system prompts a generative AI model to output a communication that imparts the identity of the dysfunctional network pathway, a cause of the dysfunctional network pathway, a relationship between the dysfunctional network pathway and the issue experienced by the user, actions that potentially resolve the dysfunctional network pathway, and/or other information. The system transmits the communication to the user by presenting the communication on a user interface. Optionally, the communication presented to the user includes or is accompanied by a visualization. The visualization illustrates the dysfunctional network pathway within a topology of a computer network.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming the entity's own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment, such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on one another, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource when the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset when the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for each tenant, a set of applications that the tenant is authorized to access. For each application, a list of tenant IDs of tenants authorized to access the application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

This application may include references to certain trademarks. Although the use of trademarks is permissible in patent applications, the proprietary nature of the marks should be respected and every effort made to prevent their use in any manner that might adversely affect their validity as trademarks.

3. Computer System

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Network Pathway Diagnosis System

Figure 6:
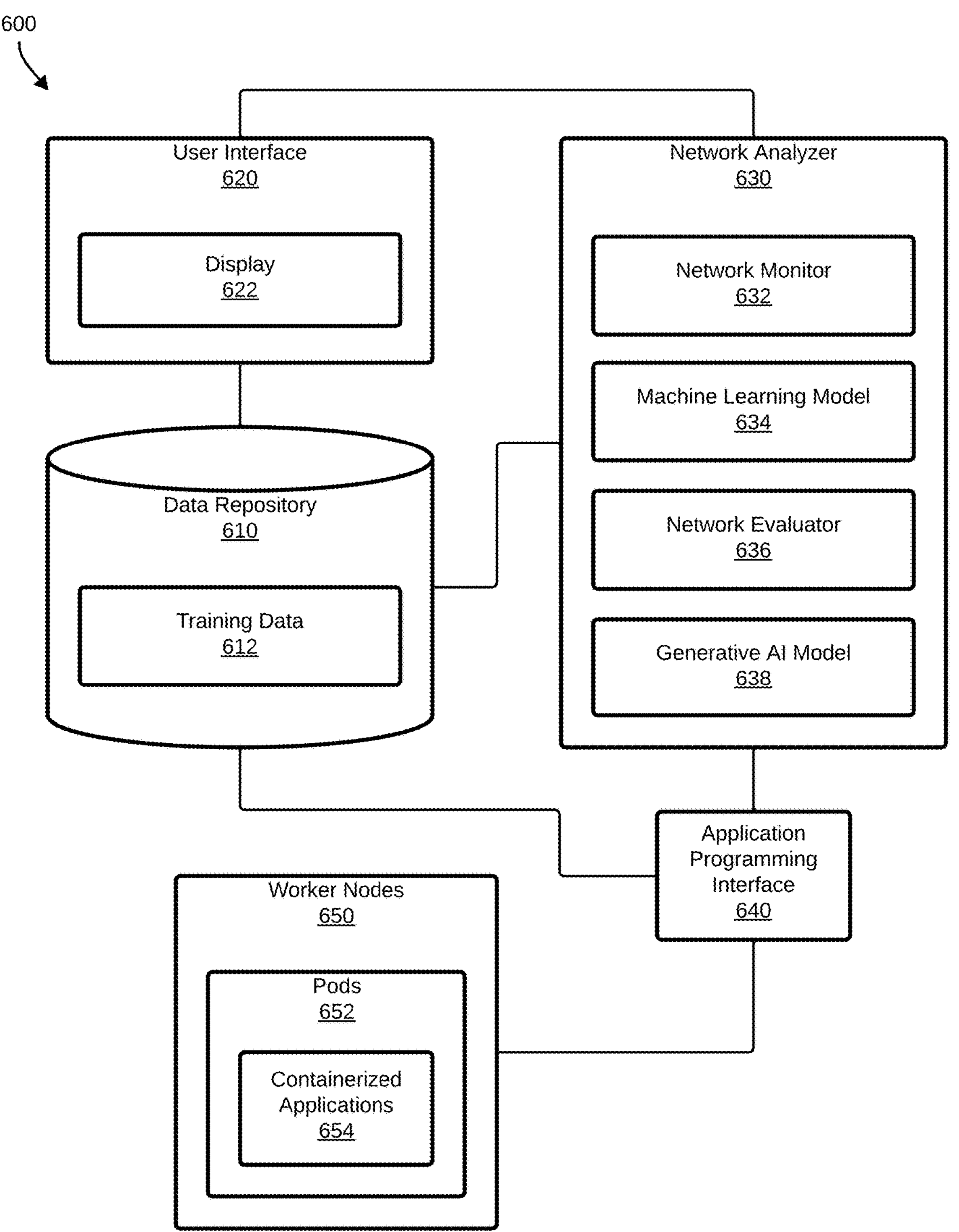
FIG. 6 illustrates a network pathway diagnosis system in accordance with one or more embodiments.

FIG. 6 illustrates a system 600 in accordance with one or more embodiments. As illustrated in FIG. 6, system 600 includes data repository 610, user interface 620, network analyzer 630, and/or application programming interface (API) 640. In one or more embodiments, the system 600 may include more or fewer components than the components illustrated in FIG. 6. The components illustrated in FIG. 6 may be local to or remote from one another. The components illustrated in FIG. 6 may be implemented in software and/or hardware. Components may be distributed over multiple applications and/or machines. Multiple components may be combined into one application and/or machine. Operations described with respect to one component may instead be performed by another component.

In one or more embodiments, system 600 refers to hardware and/or software configured to perform operations described herein for diagnosing a network pathway. Examples of operations for diagnosing a network pathway are described below with reference to FIG. 7.

In one or more embodiments, a data repository 610 is any type of storage unit and/or device (e.g., a file system, database, collection of tables, or any other storage mechanism) for storing data. Further, a data repository 610 may include multiple different storage units and/or devices. The multiple different storage units and/or devices may or may not be of the same type or located at the same physical site. Further, a data repository 610 may be implemented or executed on the same computing system as other components of the system 600. Additionally, or alternatively, a data repository 610 may be implemented or executed on a computing system separate from other components of the system 600. Data repository 610 is communicatively coupled to user interface 620, network analyzer 630, application interface 640, and/or other components of system 600. The data repository 610 may be communicatively coupled to the other components of system 600 via a direct connection or via a network. As illustrated in FIG. 6, data repository 610 includes training data 612. Information describing training data 612 may be implemented across any of the components within the system 600. However, this information is illustrated within the data repository 610 for purposes of clarity and explanation.

In an embodiment, training data 612 is information that can be used to train a machine learning model. Training data 612 is generated by system 600 and/or defined by a user. An example set of training data 612 defines an association between an issue associated with a computer network and a network pathway of the computer network. Additionally, or alternatively, training data 612 includes feedback pertaining to previous applications of system 600.

In an embodiment, training data 612 includes historical data. In an example, a set of training data may be generated based on a support ticket that describes an issue experienced by a user of a cluster of computing nodes configured for executing containerized applications and records of a diagnosis of a network pathway that led to a resolution of the issue.

In one or more embodiments, user interface 620 is hardware and/or software configured to facilitate communications between a user and system 600. User interface 620 renders user interface elements and receives user input via user interface elements. Example user interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. User interface 620 is communicatively coupled to data repository 610, network analyzer 630, and/or other components of system 600.

In an embodiment, user interface 620 includes user interface elements that can be interacted with to indicate an issue experienced by a user. In an example, user interface 620 includes user interface elements that can be selected by a user to indicate characteristics associated with an issue (e.g., a type of an issue, a severity of an issue, a location of an issue, a scale of an issue, a frequency of an issue, a timing of an issue, symptoms of an issue, events relating to the issue, etc.). In another example, user interface 620 includes a text field that a user may populate with natural language input that describes an issue. In yet another example, user interface 620 includes audio sensors and/or light sensors that are configured to capture spoken and/or signed natural language input describing an issue.

In an embodiment, user interface 620 includes user interface elements that allow a user to indicate approval and/or disapproval of a recommendation presented to a user. Additionally, or alternatively, user interface 620 includes user interface elements allowing a user to define a custom diagnostic. Additionally, or alternatively, user interface 620 includes user interface elements allowing a user to verify network polices of a computer network.

In an embodiment, different components of user interface 620 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, user interface 620 is specified in one or more other languages, such as Java, C, or C++.

In an embodiment, user interface 620 is associated with a component for presenting information to a user such as display 622. Display 622 is implemented on a digital device or otherwise. Display 622 may be, for example, a visual device, an audio device, an audiovisual device, etc. Examples of visual devices include monitors, televisions, projectors, smart phones, and other devices.

In one or more embodiments, network analyzer 630 is hardware and/or software configured to diagnose a network pathway of a computer network. Network analyzer 630 is communicatively coupled to data repository 610, user interface 620, API 640, and/or other components of system 600. As illustrated in FIG. 6, network analyzer 630 includes network monitor 632, machine learning model 634, network evaluator 636, and/or generative AI model 638.

In an embodiment, network monitor 632 is configured to detect network pathways and network components in a computer network. In an example, network monitor 632 can detect network components and network pathways of a computer network that incorporates a cluster of computing nodes configured for executing containerized applications. Network monitor 632 can generate a topology that illustrates detected network components and network pathways of a computer network.

In an embodiment, network monitor 632 is configured to detect network pathways and network components based on network configuration information. Network configuration information includes network policies, security rules, routing information, characteristics of network pathways, characteristics of network components, and/or other information. Example characteristics of a network pathway include a type of the network pathway, capacity of the network pathway, if the network pathway is unidirectional or bidirectional, a source of the network pathway, a source port of the network pathway, a destination of the network pathway, a destination port of the network pathway, network components intersected by the network pathway, communication protocols of the network pathway, applicable routing information, applicable security rules, and/or other information. Examples of characteristics of a network component include type of the network component, capacity of the network component, unique identifier(s), an IP address, a node pool, a subnet, a VCN, a tenancy, a cluster ID, relationships to other network components and network pathways, and/or other information.

In an embodiment, network monitor 632 is configured to detect an issue associated with a computer network. In an example, an issue detected by network monitor 632 is related to a cluster of computing nodes configured for executing containerized applications. An issue associated with a computer network may correspond to dysfunction in the computer network. For example, a dysfunctional network pathway may result in an issue associated with a computer network. "Dysfunction" refers to a lack of function and/or functionality that is less than optimal. In an example, a dysfunctional network pathway may be characterized by a lack of connectivity, network congestion, packet loss, high latency, jitter, security vulnerability, unexpected bandwidth limitations, and/or performance in a manner that is otherwise not intended.

In an embodiment, network monitor 632 is configured to detect an issue based on user activity. For example, an issue associated with a computer network may be experienced by a user of the computer network, and network monitor 632 is configured to detect the issue by obtaining user input that is indicative of the issue. Network monitor 632 can obtain user input through user interface 620. Network monitor 632 can process user inputs to determine characteristics associated with an issue. For example, network monitor 632 can apply natural language processing to a natural language input that describes an issue experienced by a user to determine characteristics associated with the issue.

In an embodiment, network monitor 632 is configured to autonomously detect an issue associated with a computer network by actively observing network operating conditions, network activity, and/or other information. In an example, network monitor 632 is configured to detect issues associated with a computer network that includes a cluster of computing nodes configured for executing containerized applications. In this example, sources of network operating conditions, network activity, and other information include logs of individual components of the cluster, metrics indicating characteristics of the cluster, health check mechanisms built into components of the cluster, events that occur in the cluster, custom pre-defined alerts that are indicative of an issue, cluster auditing, cluster validation, and/or other sources of information. Network monitor 632 can process observations to determine characteristics associated with an issue.

In an embodiment, network monitor 632 is configured to generate a feature set that represents an issue. Network monitor 632 can generate a feature set based on network configuration information, network operating condition, network activity, user activity (e.g., user input), and/or other information. A feature set defines characteristics associated with an issue. A feature set includes information that alerted network monitor 632 to an issue associated with a computer network and/or additional contextual information obtained by network monitor 632 that characterizes the issue.

In one or more embodiments, a machine learning algorithm is an algorithm that can be iterated to train a target model that best maps a set of input variables to an output variable. For example, a machine learning algorithm may be configured to generate and/or train machine learning model 634.

A machine learning algorithm is an algorithm that can be iterated to train a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm that in turn updates the target model f.

A machine learning algorithm generates a target model f such that the target model f best fits the datasets of training data to the labels of the training data. Additionally, or alternatively, a machine learning algorithm generates a target model f, so when the target model f is applied to the datasets of the training data, a maximum number of results determined by the target model f matches the labels of the training data. Different target models can be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, machine learning model 634 is configured to select a network pathway for diagnosis based on characteristics associated with an issue. Machine learning model 634 can obtain characteristics associated with an issue from a feature set generated by network monitor 632 and/or other sources. An example set of characteristics associated with an issue includes characteristics of the issue, network characteristics, user characteristics, and/or other characteristics. Example characteristics of an issue include a type of the issue (e.g., a connectivity issue, a performance issue, a security issue, etc.), a timing of the issue, a frequency of the issue, a scale of the issue, a severity of the issue, a location of the issue, symptoms of the issue, and/or other information. Examples network characteristics associated with an issue include characteristics of network components related to the issue, characteristics of network pathways related to the issue, network events relating to the issue (e.g., temporally, causally, topologically, etc.), network policies, network topology, network load, network performance, network capacity, and/or other information. Examples of user characteristics associated with an issue include user permissions, account type, historical interactions with system 600, historical user activity (e.g., alterations to a configuration of a computer network), a user's experience with configuring clusters of computing nodes, and/or other information. A user's level of experience configuring clusters of computing nodes may correlate to a likelihood of the user misconfiguring a computer network, including a cluster of computing nodes.

Additional embodiments and/or examples relating to using machine learning for selecting a network pathway are described below in Section 6, titled "Machine Learning for Network Pathway Selection."

In an embodiment, network evaluator 636 is configured to evaluate the functionality of a network pathway. Network evaluator 636 can evaluate connectivity, performance, bandwidth, reliability, health, redundancy, security, and/or other aspects of a network pathway. Network evaluator 636 is configured to evaluate the functionality of network pathways that are selected by system 600 (e.g., via an application of machine learning model 634) and/or network pathways that are selected by a user.

In an embodiment, network evaluator 636 is configured to evaluate the connectivity of a network pathway based on predicting a connectivity status of the network pathway. A predicted connectivity status of a network pathway indicates whether or not network traffic should be able to successfully transmit through the network pathway. Network evaluator 636 can predict a connectivity status of a network pathway by analyzing network configuration information. In particular, network evaluator 636 is configured to predict a connectivity status of a network pathway in a computer network based on analyzing security rules and routing information of the computer network that are applicable to the network pathway. Example sources of security rules include network security groups, security lists, and/or other sources. Example sources of routing information include route tables and/or other sources.

In an embodiment, network evaluator 636 is configured to evaluate the connectivity of a network pathway by testing the connectivity of the network pathway. Network evaluator 636 can test the connectivity of a network pathway by attempting to transmit network traffic through the network pathway.

In an embodiment, generative AI model 638 is configured to formulate natural language communications. Generative AI model 638 can formulate a communication based on a diagnosis of a network pathway. An example communication formulated by generative AI model 638 provides insights into network connectivity, routing behavior, security postures, and/or other attributes of a computer network. Generative AI model 638 is a large language model (LLM), a recurrent neural network (RRN), a sequence-to-sequence model, a conditional variational autoencoders (CVAEs), and/or another type of generative AI model that is configured to output natural language communications. Additionally, or alternatively, generative AI model 638 is configured to query a user for information pertaining to an issue experienced by the user. Additionally, or alternatively, generative AI model 638 is configured to generate visualizations (e.g., diagrams, charts, tables, pictures, etc.).

In one or more embodiments, API 640 facilitates communications between components of system 600 and/or components external to system 600. In an example, network analyzer 630 is configured to retrieve data by "pulling" the data via API 640 using a set of credentials. In another example, a provider of information may be configured to push data to network analyzer 630 via API 640 using a set of credentials.

In an embodiment, API 640 is an API of a cloud provider that provides network analyzer 630 with information regarding a computer network that is supported by the cloud provider. API 640 may be exposed by an API server residing in a control plane of a cluster of computing nodes configured for executing containerized applications.

In an embodiment, worker nodes 650 are components of a cluster of computing nodes configured for executing containerized applications. A Kubernetes cluster is an example of a cluster of computing nodes configured for executing containerized applications. Worker nodes 650 reside in a data plane of the cluster and execute tasks assigned to the worker nodes 650 by a control plane of the cluster. Worker nodes 650 host pods 652. Pods 652 are resources of the cluster that serve as an execution environment for containerized applications 654. A containerized application 654 is a software application packaged into a container. Software applications are packaged into containers with any dependencies that that might be needed to run the software application. Example dependencies of a software application that might be packaged into a container with the software application include libraries, binaries, configuration files, frameworks, and/or other information. Containerized applications 654 can be executed in any computing environment that supports the container format. Examples of container formats include Docker containers, Linux containers, Solaris containers, and other formats.

In an embodiment, system 600 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a tenant is a corporation, organization, enterprise, or other entity that accesses a shared computing resource.

5. Diagnosing a Network Pathway

Figure 7:
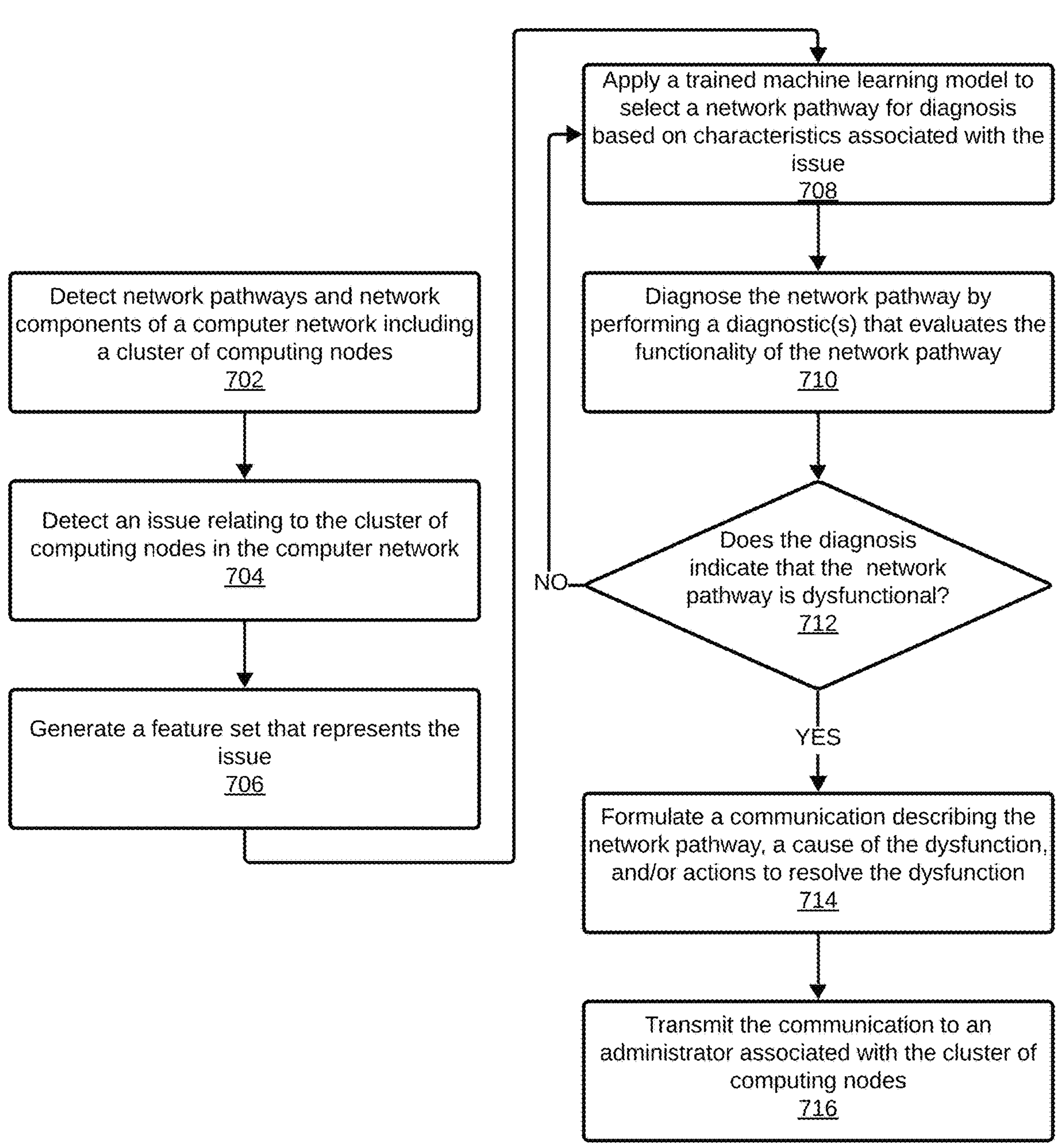
FIG. 7 illustrates an example set of operations for diagnosing a network pathway in accordance with one or more embodiments.

FIG. 7 illustrates an example set of operations for diagnosing a network pathway of a computer network in accordance with one or more embodiments. One or more operations illustrated in FIG. 7 may be modified, rearranged, or omitted. Accordingly, the particular sequence of operations illustrated in FIG. 7 should not be construed as limiting the scope of one or more embodiments.

In an embodiment, the system detects network pathways and network components (Operation 702). The system detects virtual network pathways, physical network pathways, virtual network components, and/or physical network components. The system detects network pathways and network components based on network configuration information and/or other information. Network configuration information is obtained from various sources. As an example, consider a computer network that includes a cluster of computing nodes configured for executing containerized applications. In this example, the system obtains network configuration information of the computer network from cloud provider APIs (e.g., an API server of a control plane in the cluster of computing nodes and/or other APIs), network plugins, service discovery mechanisms, ingress controllers, a data repository, and/or other sources. The network pathways and network components detected by the system in this example may be distributed across multiple clusters, tenancies, namespaces, VCNs, planes, subnets, hosts, and/or other boundaries of the computer network. Network components detected in this example include nodes, pods, load balancers, SSH hosts, internet gateways, NAT gateways, service gateways, API endpoints, and/or other network components.

Additionally, or alternatively, the system generates data structures to represent network pathways and/or network components. As an example, assume that a computer network includes a cluster of computing nodes that are present in node subnets. Further assume that pods existing in pod subnets are run on the computing nodes. In this example, the system generates hash sets to represent node subnets and/or pod subnets. The hash sets allow the system to more efficiently access information that is used to detect an issue, diagnose a network pathway, and/or perform other operations.

Additionally, or alternatively, the system produces a topology of a computer network based on network configuration information and/or other information. A topology of a computer network describes characteristics and relationships of network components and/or network pathways. An example visualization of a topology illustrates how various network pathways connect various network components of a computer network.

In an embodiment, the system detects an issue associated with a computer network (Operation 704). The system detects an issue associated with a computer network based on user input and/or based on proactively monitoring the computer network for issues. In an example, the system detects an issue based on user input to a user interface. The user input includes selections of user interface elements that correspond to characteristics associated with an issue. For instance, a user might interact with the user interface to indicate a type of issue that is being experienced by the user (e.g., a connectivity issue, a performance issue, a security issue, etc.). Additionally, or alternatively, the user input includes natural language input. For instance, a user might input into a text field of a user interface a natural language description of the issue that is being experienced by the user. In another example, the system autonomously detects an issue relating to a cluster of nodes in a computer network by actively observing network operating conditions, network activity, user activity, and/or other information. The system proactively monitors the computer network through various mechanisms. For instance, the system monitors logs of individual components in a cluster (e.g., the API server, controller manager, scheduler, individual pods, etc.), monitors metrics indicating a status of the cluster and/or components of the cluster (e.g., cluster health, resource utilization, performance, etc.), triggers health-check mechanisms built into components of the cluster (e.g., readiness and liveness probes of pods and containers), monitors events relating to the cluster (e.g., creation events, deletion events, updates, failed operation events, events indicating irregular behavior, etc.), receives custom pre-defined alerts, performs cluster auditing, performs cluster validation, queries a user of the cluster, and/or exercises other mechanisms for monitoring the computer network.

In an embodiment, the system generates a feature set(s) representing an issue(s) (Operation 706). A feature set representing an issue defines characteristics associated with the issue. The feature set is generated based on information that alerts the system to the issue (e.g., user input and/or observations indicative of an issue). In an example, the feature set defines characteristics associated with an issue that are determined by applying natural language processing to a natural language user input that describes the issue. Additionally, or alternatively, the feature set is generated based on additional contextual information that characterizes the issue. The additional contextual information is network configuration information, network operating conditions, network activity, user activity, a topology of the network, and/or other information that the system retrieves responsive to detecting the issue. The system retrieves additional contextual information without assistance from a user. Additionally, or alternatively, the system retrieves additional contextual information by querying a user. The system queries a user that experiences a detected issue, an administrator of a computer network associated with the issue, and/or other users. In an example, the system transmits a predetermined query for information to a user. In another example, the system formulates a new query that is tailored to the application of the system. In this example, the system formulates the new query by prompting a generative AI model to output a natural language interrogative that is designed to elicit a particular set of information (e.g., a particular characteristic associated with the issue).

In an embodiment, the system applies a machine learning model(s) to select a network pathway(s) of a computer network for diagnosis (Operation 708). A machine learning model selects a network pathway based on a set of characteristics associated with an issue. The machine learning model obtains the set of characteristics associated with the issue from a feature set representing the issue and/or other sources. The set of characteristics includes characteristics of the issue (e.g., a type of the issue, timing of the issue, symptoms of the issue, etc.), characteristics of the computer network that the issue occurs in (e.g., a topology of the computer network, network policies, network load, etc.), user characteristics (e.g., a user's experience with the computer network, user activity, account type, etc.), and/or other characteristics. In an example, the machine learning model is applied to select a network pathway in a computer network that includes a cluster of computing nodes configured for executing containerized applications. In this example, the machine learning model selects a network pathway that has a source or destination at a node in the cluster, a pod running on a node in the cluster, a load balancer of the cluster, an API endpoint of the cluster, and/or other network components.

In an embodiment, the system diagnoses a network pathway (Operation 710). The system diagnoses a network pathway by executing a diagnostic(s) evaluating the functionality of the network pathway. An appropriate diagnostic for evaluating the network pathway is chosen from a pre-existing set of diagnostics and/or is newly generated for the application. A new diagnostic is generated by the system and/or is defined by a user. An appropriate diagnostic is selected and/or generated based on characteristics of the network pathway, characteristics of network components connected by the network pathway, characteristics associated with an issue, and/or other information. As an example, assume that the network pathway selected for diagnosis connects two pods running on nodes of a cluster of computing nodes. In this example, an appropriate diagnostic for evaluating the network pathway is determined, at least in part, based on a type of the network pathway. For instance, the system might determine if the network pathway between the two pods is a container network interface (CNI) network pathway, a native pod networking (NPN) network pathway, and/or another type of network pathway. Different types of network pathways (e.g., a CNI network pathway vs. an NPN network pathway) can be governed by different security rules and/or other constraints. Network pathways having different security rules may require different diagnostics to evaluate the same attribute.

Diagnosing the network pathway may involve performing a diagnostic(s) that evaluates the connectivity of the network pathway. A diagnostic that evaluates the connectivity of the network pathway evaluates unidirectional connectivity or bidirectional connectivity. The diagnostic evaluates the connectivity of the network pathway by predicting a connectivity status of the network pathway. The predicted connectivity status of the network pathway indicates if network traffic should be able to successfully transmit through the network pathway. The connectivity status of the network pathway is predicted without attempting to transmit network traffic through the network pathway. The system generates the prediction of the connectivity status based on analyzing network configuration information. In particular, the system analyzes routing information and security rules of a computer network that includes the network pathway. Example sources of routing information include route tables and/or other sources. The system analyzes information in route tables (e.g., details about destination classless inter-domain routing and next-hop targets) to understand how traffic is routed within the computer network. Example sources of security rules include network security groups, security lists, and/or other sources. The system analyzes the security rules of the computer network to determine the communications that are allowed and denied through the network pathways connecting the network components of the computer network. By combining the analyses of routing information and security rules, the system predicts the connectivity status of the network pathway. Additionally, or alternatively, the system evaluates the connectivity of a network pathway by testing the connectivity of the network pathway. The system tests the connectivity of the network pathway by attempting to transmit network traffic through the network pathway.

Diagnosing the network pathway may involve performing multiple diagnostics. The multiple diagnostics are executed in parallel and/or in succession. Prior to executing the multiple diagnostics, the system determines a sequence for executing the multiple diagnostics. The sequence is determined based on evaluating the computational overhead that is required to execute the multiple diagnostics. In an example, the multiple diagnostics are divided into subsets of diagnostics. In this example, a sequence for executing the diagnostics dictates that the diagnostics of a subset are executed in parallel, and the subsets are executed in succession (i.e., one subset is executed after another subset).

The system diagnoses a network pathway without user approval or subject to user approval. In an example of the latter scenario, the system transmits a recommendation to a user that a diagnosis should be performed in a computer network that includes a cluster of computing nodes configured for executing containerized applications. The recommendation indicates a candidate network pathway selected for diagnosis, a candidate diagnostic to evaluate the candidate network pathway, and/or other information. The system executes the candidate diagnostic upon receiving user input indicating approval of the recommendation. The recommendation presented to the user can include multiple candidate network pathways and/or multiple candidate diagnostics. Optionally, the multiple candidate diagnostics are assigned relative levels of priority. For instance, a high-priority candidate diagnostic corresponds to a candidate network pathway that is crucial to the functionality of the cluster of computing nodes, and a lower-priority candidate diagnostic corresponds to a candidate network pathway that is commonly used but not as crucial to the functionality of the cluster of computing nodes.

The system optionally verifies the presence of appropriate network policies prior to performing a diagnosis of a network pathway. In an example, the system verifies the presence of a network policy(s) that enables the system to successfully execute diagnostic(s). The system independently verifies if an appropriate network policy is in effect, or the system interacts with a user to ensure that the appropriate network policy is in effect. In an example, if verification reveals the absence of an appropriate network policy, the system provides guidance to a user describing how to enable the appropriate network policy.

In an embodiment, the system proceeds to another operation based on the results of diagnosing a network pathway (Operation 712). For example, if diagnosing a network pathway reveals that the network pathway is dysfunctional (YES in Operation 712), the system proceeds to Operation 714. Alternatively, if the diagnosis of the network pathway indicates that the network pathway is functioning normally (NO in Operation 712), the system returns to Operation 708. In the latter scenario, another network pathway may be selected for diagnosis.

In an embodiment, the system formulates a communication(s) based on diagnosing a network pathway(s) (Operation 714). If a diagnosis of a network pathway reveals that the network pathway is dysfunctional, a corresponding communication identifies the dysfunctional network pathway. Additionally, or alternatively, the communication identifies a cause of the dysfunctional network pathways and/or rules out potential causes of the dysfunctional network pathway. As an example, assume that the system analyzes the security rules of a computer network to evaluate the connectivity of a network pathway. Further assume that, in the course of the analysis, the system assesses that a particular security rule prevents network traffic from transmitting through the network pathway. In this example, a corresponding communication identifies the particular security rule that is causing the network pathway's lack of connectivity.

Additionally, or alternatively, the communication describes actions that could resolve the dysfunctional network pathway. As an example, assume that the system analyzes routing information of a computer network to evaluate the connectivity of a network pathway. Further assume that, in the course of the analysis, the system assesses that a misconfiguration of a routing policy of the computer network prevents network traffic from transmitting through the network pathway. In this example, a corresponding communication describes how the network routing policy can be reconfigured to allow network traffic to successfully transmit through the network pathway.

Additionally, or alternatively, the communication describes how the dysfunctional network pathway is related to an issue experienced by a user. As an example, assume that an issue is detected based on a natural language user input that describes the issue. In this example, a corresponding communication describes how a dysfunctional network pathway is related to the issue described by the user.

Additionally, or alternatively, the communication includes other information that could be beneficial to a user in resolving dysfunction and/or optimizing performance of a computer network. In an example, a communication directs a user to relevant documentation, tools, technical support contacts, and/or other resources that could facilitate a resolution of the dysfunctional network pathway.

The system may utilize a generative AI model to formulate the communication. As an example, assume an issue is detected based on user input describing the issue, and the diagnosis of a network pathway reveals the network pathway is dysfunctional. In this example, the system prompts the generative AI model to output a communication that imparts the identity of the dysfunctional network pathway, a cause of the dysfunctional network pathway, a relationship between the dysfunctional network pathway and the issue described by the user, actions that may resolve the dysfunctional network pathway, and/or other information.

In an embodiment, the system transmits a communication(s) to a user(s) (Operation 716). The system transmits a communication to a user by presenting the communication on a user interface. The communication optionally includes or is presented with a visualization(s). The visualization presented with the communication illustrates network architecture, identifies network bottlenecks, points of failures, opportunities for troubleshooting or optimization, and/or other information. In an example, a visualization illustrates a dysfunctional network pathway within a topology of a computer network that is associated with an issue. The system optionally engages in further communications with the user. In an example, a generative AI model is utilized to respond to a query regarding a dysfunctional network pathway and/or an issue associated with a computer network that the system receives from a user.

6. Machine Learning for Network Pathway Selection

Figure 8:
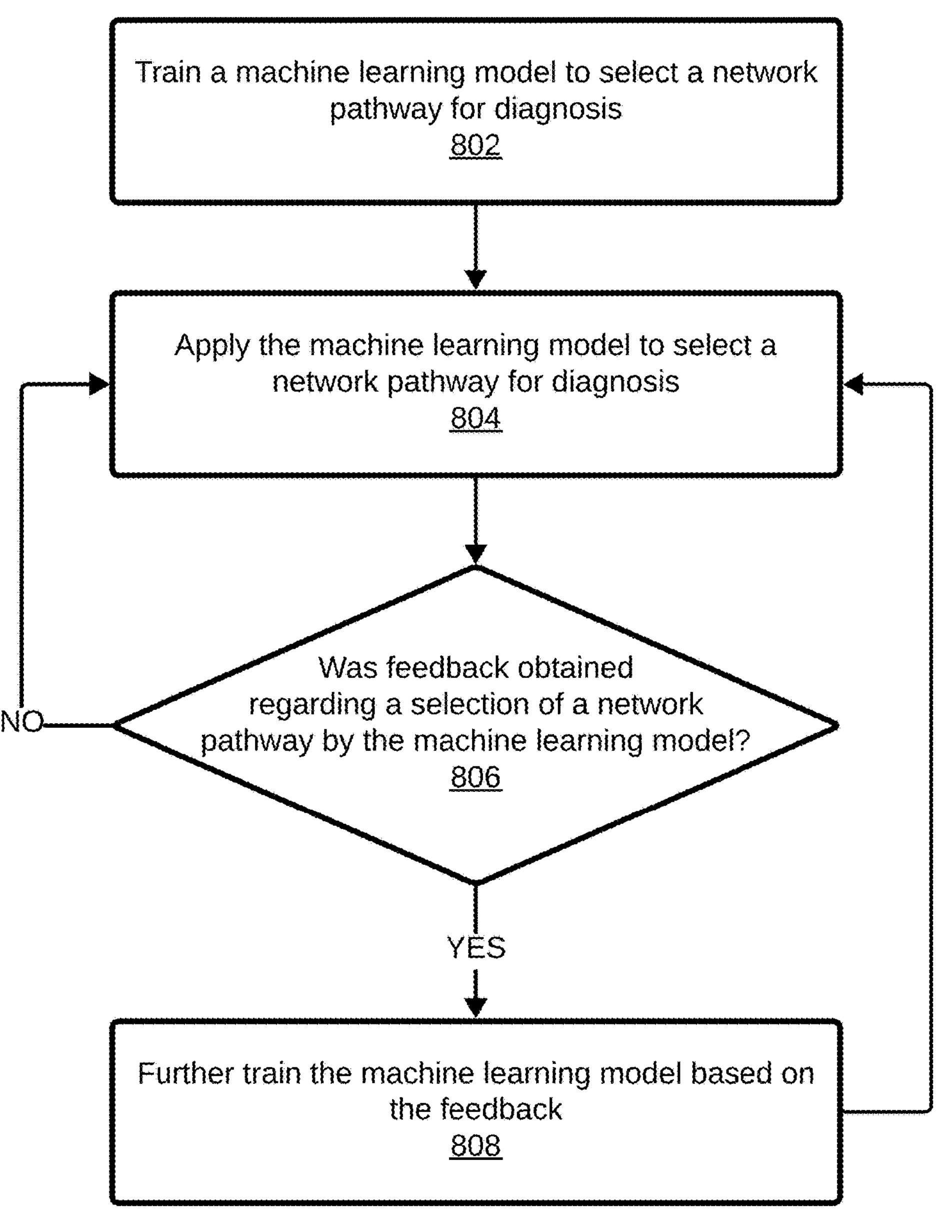
FIG. 8 illustrates an example set of operations for training a machine learning model to select network pathways for diagnosis in accordance with one or more embodiments.

FIG. 8 illustrates an example set of operations for training a machine learning model to select a network pathway in accordance with one or more embodiments. One or more operations illustrated in FIG. 8 may be modified, rearranged, or omitted. Accordingly, the particular sequence of operations illustrated in FIG. 8 should not be construed as limiting the scope of one or more embodiments.

In an embodiment, the system trains a machine learning model(s) to select network pathway(s) for diagnosis (Operation 802). The machine learning model is trained by a machine learning algorithm with sets of training data obtained from a data repository and/or other sources. The sets of training data define associations between issues of computer networks and network pathways of the computer networks. The machine learning algorithm performs an iterative process of feeding the training data to the machine learning model and adjusting the machine learning model's internal parameters to optimize the machine learning model's ability to identify patterns and relationships in the training data. In an example, a machine learning model is trained to select for diagnosis a network pathway of a computer network that incorporates a cluster of computing nodes configured for executing containerized applications. In particular, the machine learning model is trained to select a network pathway that, if dysfunctional, is a probable cause of an issue associated with the computer network. An example set of training data identifies a set of characteristics associated with an issue relating to a cluster of computing nodes and a network pathway to be selected for diagnosis.

In an embodiment, the system applies a trained machine learning model(s) to select a network pathway(s) for diagnosis (Operation 804). A machine learning model selects a network pathway based on a set of characteristics associated with an issue. The machine learning model obtains the set of characteristics associated with the issue from a feature set representing the issue and/or other sources. The set of characteristics includes characteristics of the issue (e.g., a type of the issue, timing of the issue, symptoms of the issue, etc.), characteristics of the computer network that the issue occurs in (e.g., a topology of the computer network, network policies, network load, etc.), user characteristics (e.g., a user's experience with the computer network, user activity, account type, etc.), and/or other characteristics.

In an embodiment, the system proceeds to another operation based on if the system receives feedback regarding a selection by a machine learning model (Operation 806). For example, if the system receives feedback regarding a selection of a network pathway by a machine learning model (YES in Operation 806), the system proceeds to Operation 808. Alternatively, if feedback is not received (NO in Operation 806), the system returns to Operation 804. The system actively collects feedback indicating the performance of the machine learning model. User input is a source of feedback. Example feedback from a user includes user interactions, user preferences, and/or user responses to selections of the trained machine model. In an example, a set of feedback is generated based on user input indicating if an issue experienced by a user has been resolved as a result of a selection by the machine learning model. The system passively collects feedback from users and/or proactively seeks to elicit feedback from a user. Additionally, or alternatively, the system generates feedback without user input. In an example, the system generates a set of feedback based on identifying a selection error. The system may identify a selection of a network pathway as an error if diagnosis of the network pathway indicates that the network pathway is functioning normally and/or if the diagnosis of the network pathway does not result in resolving an issue associated with the computer network.

In an embodiment, the system further trains a machine learning model(s) based on feedback regarding a selection by the machine learning model(s) (Operation 808). As an example, assume that a machine learning model selects a network pathway for diagnosis, and the system receives feedback regarding the selection of the network pathway. In this example, the system analyzes the feedback and generates additional training data based on the feedback, and the additional training data is then used to further train the machine learning model. The system analyzes feedback using a process of assimilating new data patterns, user interactions, and error trends into a data repository of the system. The system uses this information to identify shifts in data trends or emergent patterns that were not present or were inadequately represented in the original training data. Based on this analysis, the system initiates a retraining or updating cycle for the machine learning model. If feedback suggests minor deviations or incremental changes in data patterns, incremental learning strategies are employed to retrain the machine learning model. Incremental learning strategies are used for fine-tuning the machine learning model with the new data while retaining the machine learning model's previously learned knowledge. If feedback indicates significant shifts or the emergence of new patterns, a more comprehensive model updating process is initiated. This process might involve revisiting a machine learning model selection process, re-evaluating the suitability of the current model architecture, and/or potentially exploring alternative models or configurations that are more attuned to the new data. The system tracks changes, modifications, and/or the evolution of the machine learning model as result of further training based on feedback. Tracking changes, modifications, and evolution of the machine learning model facilitates transparency into the integration of feedback and enables the machine learning model to be rolled back to a previous state if appropriate.

7. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 9:
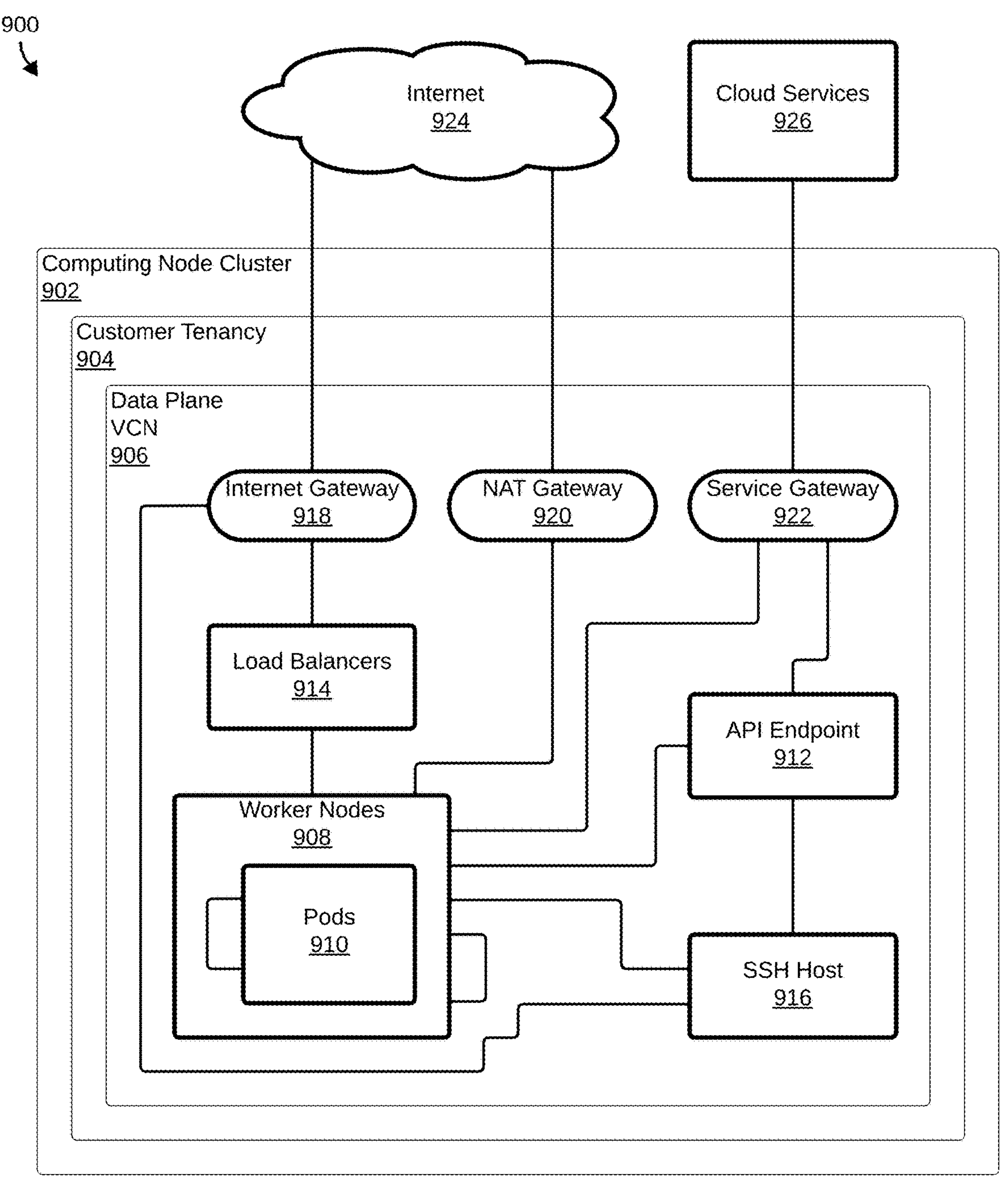
FIG. 9 illustrates an example computer network having network pathways that may be selected for diagnosis in accordance with one or more embodiments.

FIG. 9 illustrates an example computer network 900 having network pathways that may be selected for diagnosis in accordance with one or more embodiments. As illustrated in FIG. 9, computer network 900 includes a computing node cluster 902 that is communicatively coupled to internet 924 and cloud services 926. In one or more embodiments, computer network 900 may include more or fewer components than the components illustrated in FIG. 9. The components illustrated in FIG. 9 may be local to or remote from one another. The components illustrated in FIG. 9 may be implemented in software and/or hardware. Each component may be distributed over multiple applications and/or machines. Multiple components may be combined into one application and/or machine. Operations described with respect to one component may instead be performed by another component.

In an embodiment, network components of computer network 900 are communicatively coupled by network pathways. In an example, communications between network components of computer network 900 occur through network pathways at various layers of computer network 900. For instance, network components of computer network 900 may communicate through network pathways that exist in a physical layer, a data link layer, a network layer, a transport layer, a session layer, a presentation layer, and/or an application layer. In this example, the different network pathways of computer network 900 accord to various communications protocols, such as HTTP, HTTPS, SCTP, TCP, UDP, ICMP, PROXY, TLS, and/or other communications protocols.

In an embodiment, computing node cluster 902 is configured for executing containerized applications. In an example, computer node cluster 902 is a Kubernetes cluster. Computing node cluster 902 includes customer tenancy 904. Customer tenancy 904 contains data plane VCN 906. Additionally, or alternatively, computing node cluster 902 includes other tenancies and/or VCNs. In example, computing node cluster 902 includes a service tenancy, and the service tenancy contains a control plane VCN. As illustrated in FIG. 9, data plane VCN 906 includes worker nodes 908, API endpoint 912, load balancers 914, SSH host 916, internet gateway 918, NAT gateway 920, and service gateway 922. Communications between components of data plane VCN 906 and internet 924 are facilitated by internet gateway 918 and/or NAT gateway 920. Communications between components of data plane VCN 906 and cloud services 926 are facilitated by service gateway 922. In an example, an issue is detected that is associated with computer network 900 and relates to computing node cluster 902.

In an embodiment, worker nodes 908 exists in a worker node subnet(s) of data plane VCN 906. An example worker node subnet is a private subnet or a public subnet. Worker nodes 908 host and manage pods 910, communicate with a control plane of the computing node cluster 902, mount storage volumes, and/or perform other functions. Worker nodes 908 are management nodes, virtual nodes, and/or other types of nodes. Computer network 900 includes various network pathways that allow a user of computing node cluster 902 to access worker nodes 908. For example, a user of computing node cluster 902 accesses worker nodes 908 through a connection to internet 924 and/or through another network connection (e.g., a private network connection).

In an embodiment, a worker node 908 is a source or destination of a network pathway that is selected for diagnosis. Example network pathways of computer network 900 that may be selected for diagnosis include network pathways connecting a worker node 908 to cloud services 926, internet 924, SSH host 916, load balancers 914, API endpoint 912, another node (e.g., a network pathway between worker nodes 908), a user of computing node cluster 902, and/or other network components of computer network 900.

In an embodiment, pods 910 run on worker nodes 908. Pods 910 serve as an execution environment for containerized applications. In an example, computer network 900 includes multiple communications networks that support node-to-node, node-to-pod, and pod-to-pod communications. For instance, communications between worker nodes 908, communications between pods 910, and communications between worker nodes 908 and pods 910 may be supported by an NPN communications network, a CNI communications network (e.g., Flannel, Calico, Weave Net, OVN-Kubernetes, etc.), and/or other communications networks.

In an embodiment, a pod 910 is a source or destination of a network pathway that is selected for diagnosis. Example network pathways of computer network 900 that may be selected for diagnosis include network pathways connecting a pod 910 to cloud services 926, internet 924, API endpoint 912, another pod (e.g., a network pathway between pods 910), a worker node 908, a user of computing node cluster 902, and/or other network components of computer network 900. A network pathway connecting a pod 910 to a coreDNS pod is an example of a network pathway between two pods that may be selected for diagnosis. An example coreDNS pod is an instance of a coreDNS server running on a node of computing node cluster 902. It should be noted that a coreDNS server may run on worker nodes 910 and/or other nodes of computing node cluster 902 (e.g., nodes of a control plane). In an example, diagnosing a network pathway connecting a pod 910 to a coreDNS pod reveals a misconfiguration of a security list that is applicable to the network pathway.

In an embodiment, API endpoint 912 serves as an access point for communications between components of data plane VCN 906 and an API server of a control plane of the computing node cluster 902. API endpoint 912 is contained in an API endpoint subnet of data plane VCN 906.

In an embodiment, API endpoint 912 is a source or destination of a network pathway that is selected for diagnosis. Example network pathways of computer network 900 that may be selected for diagnosis include network pathways connecting API endpoint 912 to cloud services 926, internet 924, a worker node 908, a user of computing node cluster 902, and/or other network components of computer network 900. In an example, diagnosing a network pathway connecting API endpoint 912 reveals that an API subnet did not possess the correct network rules.

In an embodiment, load balancers 914 distribute workloads to worker nodes 908. Load balancers 914 are contained in a load balancers subnet of data plane VCN 906. Load balancers 914 may include different types of load balancers, such as standard load balancers, network load balancers, and/or other types of load balancers. In an example, different types of load balancers operate on different layers of computer network 900. For instance, one type of load balancer is configured to process higher-layer communications (e.g., HTTP, HTTPS, etc.), and another type of load balancer is configured to process lower-layer communications (e.g., TCP, UDP, ICMP, etc.).

In an embodiment, a load balancer 914 is a source or destination of a network pathway that is selected for diagnosis. Example network pathways of computer network 900 that may be selected for diagnosis include network pathways connecting a load balancer 914 to internet 924, a pod 910, a worker node 908, a user of computing node cluster 902, and/or other network components of computer network 900.

In an embodiment, SSH host 916 is used to gain SSH access to components of data plane VCN 906. SSH host 916 is a virtual host and/or a physical host. SSH host 916 exists in an SSH host subnet of data plane VCN 906. In an example, the SSH host subnet of data plane VCN 906 is a public subnet, and SSH host 916 is leveraged by a user of computing node cluster 902 to access a component that exists in a private subnet of data plane VCN 906. For instance, SSH host 916 might host a session that allows the user of computing node cluster 902 to access a worker node 908 that exists in a private worker node subnet.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form that such claims issue, including any subsequent correction.

What is claimed is:

1. One or more non-transitory computer-readable media comprising instructions that, when executed by one or more hardware processors, cause performance of operations comprising:

- accessing sets of training data, a first set of training data of the sets of training data defining an association between (a) a first issue relating to a first cluster of computing nodes configured for executing a first set of containerized applications and (b) one or more network pathways of a first computer network, wherein the first computer network comprises the first cluster of computing nodes;
- training a machine learning model to select network pathways in computer networks for diagnosis based on the sets of training data;
- detecting a second issue, the second issue relating to a second cluster of computing nodes configured for executing a second set of containerized applications, the second cluster of computing nodes comprised within a second computer network;
- accessing a target set of characteristics associated with the second issue;
- applying the machine learning model to the target set of characteristics to select a target network pathway in the second computer network for diagnosis; and
- based, at least in part, on applying the machine learning model to select the target network pathway, diagnosing the target network pathway, wherein diagnosing the target network pathway comprises:
  - executing one or more diagnostics corresponding to the target network pathway, wherein executing a first diagnostic of the one or more diagnostics comprises evaluating connectivity of the target network pathway by analyzing a configuration of the second computer network.

2. The one or more non-transitory computer-readable media of claim 1:

wherein the second issue is resolved based at least in part on the diagnosis of the target network pathway.

3. The one or more non-transitory computer-readable media of claim 2, wherein evaluating the connectivity of the target network pathway by analyzing the configuration of the second computer network comprises:

accessing routing information and security rules of the second computer network; and predicting a connectivity status of the target network pathway based, at least in part, on the routing information and/or the security rules.

4. The one or more non-transitory computer-readable media of claim 2, wherein the operations further comprise:

prior to executing the one or more diagnostics corresponding to the target network pathway:

verifying that one or more network policies are applied to the second computer network, wherein the one or more network policies enable the one or more diagnostics corresponding to the target network pathway to be successfully executed; and subsequent to executing the one or more diagnostics corresponding to the target network pathway:

presenting results of the one or more diagnostics on a graphical user interface (GUI).

5. The one or more non-transitory computer-readable media of claim 2, wherein the operations further comprise:

determining a second root cause of the second issue based, at least in part, on the one or more diagnostics corresponding to the target network pathway;

determining one or more actions that may resolve the second issue;

prompting a generative AI model to output a description of the one or more actions that may resolve the second issue; and presenting the description of the one or more actions that may resolve the second issue on a GUI.

6. The one or more non-transitory computer-readable media of claim 5, wherein the target network pathway connects at least a first component comprised within the second cluster of computing nodes to a second component comprised within the second computer network, wherein the second root cause of the second issue is a misconfiguration of the second cluster of computing nodes, and wherein the one or more actions comprise reconfiguring a security configuration and/or a routing configuration of the second cluster of computing nodes.

7. The one or more non-transitory computer-readable media of claim 1, wherein the first cluster of computing nodes is a Kubernetes cluster.

8. The one or more non-transitory computer-readable media of claim 1, wherein detecting the second issue comprises receiving natural language user input describing the second issue, and wherein accessing a target set of characteristics associated with the second issue comprises applying natural language processing to the natural language user input to generate a second feature set.

9. The one or more non-transitory computer-readable media of claim 8, wherein the first set of training data comprises (a) a first feature set generated by applying natural language processing to a service ticket comprising text data describing the first issue and (b) the one or more network pathways of the first computer network that are associated with the first issue, and wherein the one or more network pathways associated with the first issue are determined to correspond to a first root cause of the first issue.

10. The one or more non-transitory computer-readable media of claim 1, wherein the target set of characteristics associated with the second issue comprises at least one of (a) a type of the second issue, (b) a location of the second issue, (c) a timing of the second issue, (d) a sequence of events that are temporally, causally, and/or topologically related to the second issue, (e) a topology of the second computer network, (f) network policies of the second computer network, (g) a capacity of the second computer network, (h) a network load of the second computer network, (i) historical activity of a user of the second cluster of computing nodes, and/or (j) a user characteristic of the user of the second cluster of computing nodes.

11. The one or more non-transitory computer-readable media of claim 1, wherein the operations further comprise:

accessing feedback pertaining to the selecting of the target network pathway by the machine learning model, wherein the feedback comprises at least one of (a) user input, (b) results of the one or more diagnostics corresponding to the target network pathway, (c) a predicted connectivity status of the target network pathway, and/or (d) an indication of whether the second issue is resolved based, at least in part, on diagnosing the target network pathway; and further training the machine learning model based at least in part on the feedback.

12. A method, comprising:

accessing sets of training data, a first set of training data of the sets of training data defining an association between (a) a first issue relating to a first cluster of computing nodes configured for executing a first set of containerized applications and (b) one or more network pathways of a first computer network, wherein the first computer network comprises the first cluster of computing nodes;

training a machine learning model to select network pathways in computer networks for diagnosis based on the sets of training data;

detecting a second issue, the second issue relating to a second cluster of computing nodes configured for executing a second set of containerized applications, the second cluster of computing nodes comprised within a second computer network;

accessing a target set of characteristics associated with the second issue;

applying the machine learning model to the target set of characteristics to select a target network pathway in the second computer network for diagnosis; and based, at least in part, on applying the machine learning model to select the target network pathway, diagnosing the target network pathway, wherein diagnosing the target network pathway comprises:

executing one or more diagnostics corresponding to the target network pathway, wherein executing a first diagnostic of the one or more diagnostics comprises evaluating connectivity of the target network pathway by analyzing a configuration of the second computer network, wherein the method is performed by at least one device including a hardware processor.

13. The method of claim 12:

wherein the second issue is resolved based at least in part on the diagnosis of the target network pathway.

14. The method of claim 13, wherein evaluating the connectivity of the target network pathway by analyzing the configuration of the second computer network comprises:

accessing routing information and security rules of the second computer network; and predicting a connectivity status of the target network pathway based, at least in part, on the routing information and/or the security rules.

15. The method of claim 12, wherein the first cluster of computing nodes is a Kubernetes cluster, wherein detecting the second issue comprises receiving natural language user input describing the second issue, and wherein accessing a target set of characteristics associated with the second issue comprises applying natural language processing to the natural language user input to generate a second feature set.

16. The method of claim 15, wherein the first set of training data comprises (a) a first feature set generated by applying natural language processing to a service ticket comprising text data describing the first issue and (b) the one or more network pathways of the first computer network that are associated with the first issue, and wherein the one or more network pathways associated with the first issue are determined to correspond to a first root cause of the first issue.

17. The method of claim 12, wherein the target set of characteristics associated with the second issue comprises at least one of (a) a type of the second issue, (b) a location of the second issue, (c) a timing of the second issue, (d) a sequence of events that are temporally, causally, and/or topologically related to the second issue, (e) a topology of the second computer network, (f) network policies of the second computer network, (g) a capacity of the second computer network, (h) a network load of the second computer network, (i) historical activity of a user of the second cluster of computing nodes, and/or (j) a user characteristic of the user of the second cluster of computing nodes.

18. A system, comprising:

at least one device including a hardware processor;

the system being configured to perform operations comprising:

accessing sets of training data, a first set of training data of the sets of training data defining an association between (a) a first issue relating to a first cluster of computing nodes configured for executing a first set of containerized applications and (b) one or more network pathways of a first computer network, wherein the first computer network comprises the first cluster of computing nodes;

training a machine learning model to select network pathways in computer networks for diagnosis based on the sets of training data;

detecting a second issue, the second issue relating to a second cluster of computing nodes configured for executing a second set of containerized applications, the second cluster of computing nodes comprised within a second computer network;

accessing a target set of characteristics associated with the second issue;

applying the machine learning model to the target set of characteristics to select a target network pathway in the second computer network for diagnosis; and based, at least in part, on applying the machine learning model to select the target network pathway, diagnosing the target network pathway, wherein diagnosing the target network pathway comprises:

executing one or more diagnostics corresponding to the target network pathway, wherein executing a first diagnostic of the one or more diagnostics comprises evaluating connectivity of the target network pathway by analyzing a configuration of the second computer network.

* * * * *